United States Patent [19]

Fujimoto

[11] Patent Number: 5,020,210
[45] Date of Patent: Jun. 4, 1991

[54] AUTOMATIC TOOL CHANGER FOR A MACHINE TOOL

[75] Inventor: Akihiko Fujimoto, Yamanashi, Japan

[73] Assignee: Fanuc Ltd., Yamanashi, Japan

[21] Appl. No.: 465,136

[22] PCT Filed: May 25, 1989

[86] PCT No.: PCT/JP89/00520
§ 371 Date: Feb. 23, 1990
§ 102(e) Date: Feb. 23, 1990

[87] PCT Pub. No.: WO90/00104
PCT Pub. Date: Jan. 11, 1990

[30] Foreign Application Priority Data

Jun. 30, 1988 [JP] Japan ................... 63-160731

[51] Int. Cl.$^5$ .............................................. B23Q 3/157
[52] U.S. Cl. ......................................................... 29/568
[58] Field of Search ................................. 29/568; 408/35

[56] References Cited

U.S. PATENT DOCUMENTS

| 4,679,296 | 7/1987 | Watanabe et al. | 29/568 |
|---|---|---|---|
| 4,813,122 | 3/1989 | Watanabe et al. | 29/568 |
| 4,827,600 | 5/1989 | Miyano | 29/568 |
| 4,835,838 | 6/1989 | Hirose | 29/568 |
| 4,870,744 | 10/1989 | Araki et al. | 29/568 |
| 4,873,756 | 10/1989 | Yamane et al. | 29/568 |
| 4,955,127 | 9/1990 | Suda et al. | 29/568 |

FOREIGN PATENT DOCUMENTS

| 63-62630 | 3/1988 | Japan. | |
|---|---|---|---|
| 114840 | 5/1988 | Japan | 29/568 |
| 642842 | 1/1989 | Japan | 29/568 |
| 1-51245 | 2/1989 | Japan | 29/568 |

Primary Examiner—William Briggs
Attorney, Agent, or Firm—Armstrong, Nikaido, Marmelstein, Kubovcik & Murray

[57] ABSTRACT

An automatic tool changer having a turret (3) provided with a plurality of tool holders (9). The turret (3) is indexed at a tool changing position to remove a tool (7) from a spindle unit (1) and to attach a selected tool (7) to the spindle unit (1). A crank (6) suspended for swing motion and holding the turret (3), and a crank operating lever (4) biased by a spring (17) so as to hold the crank (6) to a standby position and operated for swing motion by a cam (8) provided on a vertically movable spindle-head (22) are interlocked by a rod (10) combined with a load limiting spring (18). The crank operating lever (4) is stopped at a set position by a stopper (24), and the crank (6) is stopped at a set position by a stopper (23) when the crank (6) is advanced toward the tool changing position. The vibration of the support shaft supporting the crank (6) when moving the turret (3) between the tool changing position and the standby position is reduced, and the tool finger (91) of the tool holder (9) moves along an ideal path when removing the tool (7) from and attaching the same to the spindle unit (1).

4 Claims, 12 Drawing Sheets

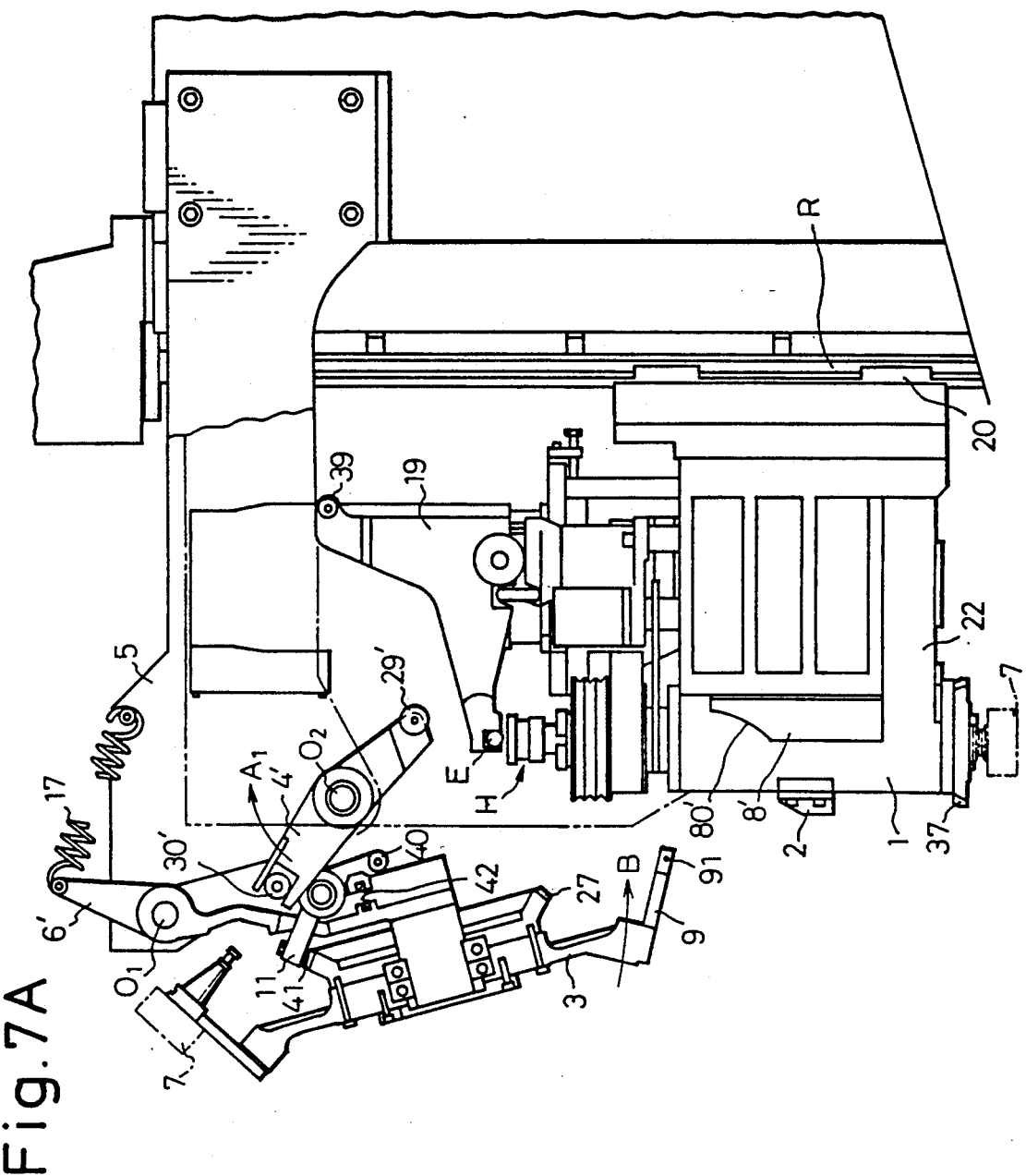

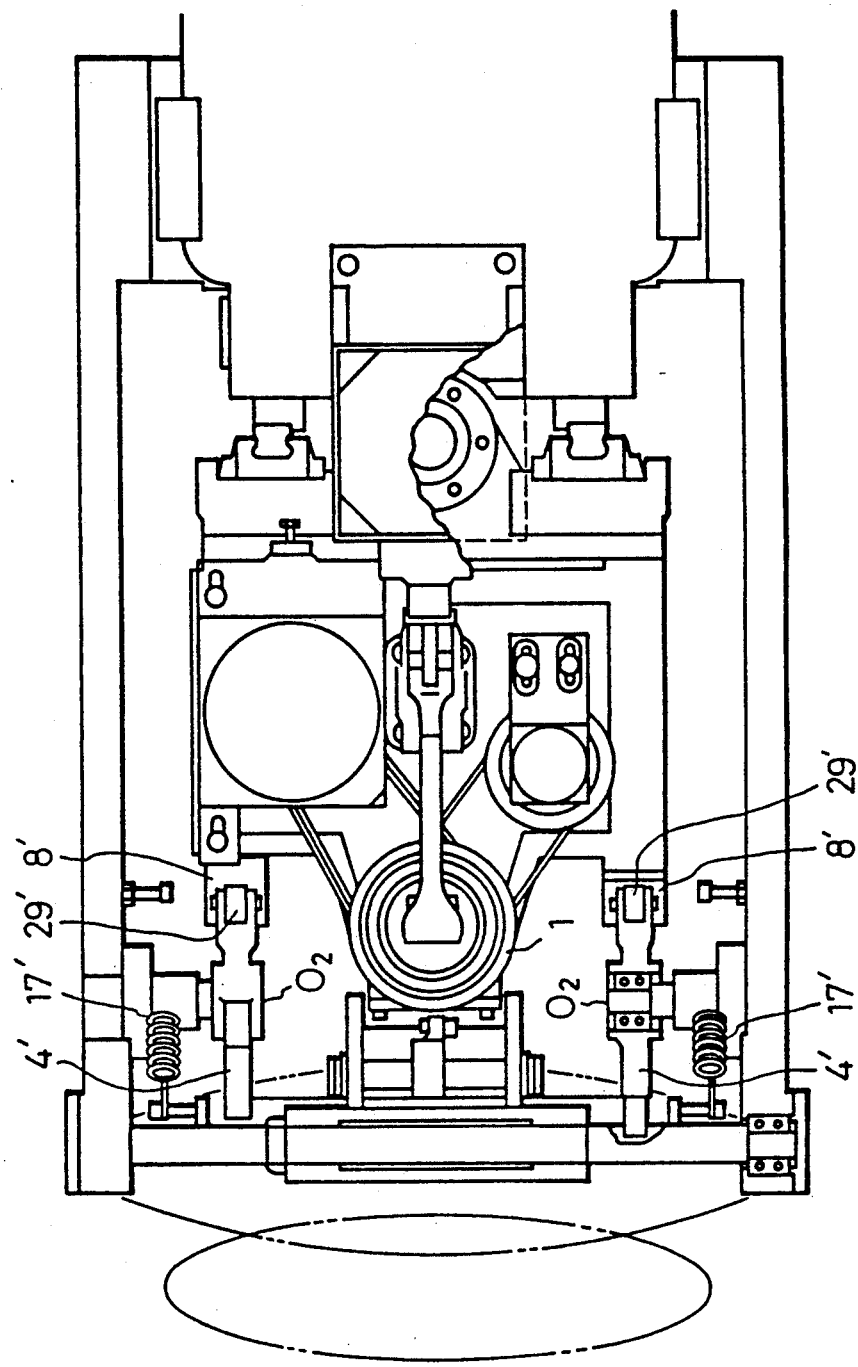

AUTOMATIC TOOL CHANGER FOR A MACHINE TOOL

DESCRIPTION

1. Technical Field

The present invention relates to an automatic tool changer having a turret provided with a plurality of tool holders, and capable of turning the turret for indexing at a tool changing position and changing a tool attached to the spindlehead of the machine tool for a selected tool.

2. Background Art

A currently used automatic tool changer, on which present invention is based, has a structure as shown in FIGS. 7A, 7B and 7C.

As shown in FIGS. 7A to 7C, a turret 3 provided with a plurality of tool holders 9 on the circumference thereof is suspended by a crank 6' pivotally supported on a support 5 for swing motion on a support shaft $O_1$, the turret 3 is biased to and held at a standby position by extension springs 17' connected respectively to the extremities of the opposite upper arms of the crank 6', and a locking lever 11 mounted on the crank is biased always by a spring 42 so that a locking projection 41 provided thereon engages a turret gear 27 to restrain the turret 3 from rotation and so that the locking projection 41 is disengaged from the turret gear 27 when a pressure is applied to a roller 40 provided at the lower end thereof. Links 4' are supported pivotally respectively on support shafts $O_2$ provided respectively on the opposite sides of the support 5 so that the upper ends of the links 4' engage rollers 30' provided on the crank 6'. Rollers 29' are provided respectively on the lower ends of the links 4'.

On the other hand, a spindlehead 22, which is vertically slidable along a linear rail R between a lower working position and an upper tool changing position, is provided with a spindle unit 1 for holding a tool 7 at the lower end thereof in the central portion of the front surface thereof. A cam 2 which engages the roller 40 to operate the locking lever 11 is attached to the middle of the front surface of the spindle unit 1. A pair of first cams 8' each having a concave cam surface 80' are attached respectively to the opposite side surfaces of the spindle unit to operate the rollers 29'. An L-shaped tool releasing lever 19 disposed in the central portion of the upper part of the spindle head is provided with a roller 39 at the upper end thereof, and an operating member E at the front end thereof. When the spindlehead is raised to the tool changing position, a second cam, not shown, acts on the roller 39 to make the operating member E of the tool releasing lever 19 operate a releasing mechanism H provided on top of the spindle unit to release the tool 7 held at the lower end of the spindle unit.

In FIG. 7A, the spindle head 22 is at the lower position for machining operation with the tool 7. When a tool change command is given, the spindle head 22 is raised from the position shown in FIG. 7A. Then, the first cams 8' come into engagement with the rollers 29', the concave cam surfaces 80' act on the rollers 29' to turn the links 4' in the direction of an arrow $A_1$ so that the crank 6' is turned in the direction of an arrow B to advance the turret 3 so that the finger 91 of an empty tool holder 9 slides into a groove 71 formed in a tool arbor at the end of a section $L_1$ of a path L' (FIG. 7C). Subsequently, after the engagement of the corners of the first cams 8' with the rollers 29', the finger moves along a curved path $L_c$ and, at the same time, the roller 39 of the tool releasing lever is subjected to the action of the upper second cam, not shown in FIG. 7A to bring the operating member E provided at the front end of the tool releasing lever into engagement with the releasing mechanism H provided at the upper end of the spindle unit 1 to release the arbor 70 from the spindle unit 1. As the spindle unit 1 is raised further, the finger 91 moves along the path $L_c$ and a path $L_2$ (FIG. 7C) to remove the tool 7 from the spindle unit 1. As the spindle unit 1 is raised further after the tool 7 has been moved, a spindle gear 37 engages the turret gear 27 and, at the same time, the third cam 2 acts on the roller 29' to turn the locking lever 11 against the resilience of the compression spring 42 to disengage the locking projection 41 from the turret gear 27. In this state, the spindle unit rotates the turret 3 for indexing to position a tool holder 9 holding a selected tool 7 under the spindle unit 1. Then, the spindle unit 1 is lowered. Then, the third cam 2 is disengaged from the roller 40 to lock the turret by the locking lever 11, the roller 39 is disengaged from the second cam to separate the operating member E of the tool releasing lever 19 from the releasing mechanism H so that the tool 7 is gripped by the spindle unit 1, and then the first cams 8' are disengaged from the rollers 29' to allow the turret 3 to be returned to the standby position to finish the tool changing operation.

This automatic tool changer on which the present invention is based has the following problems.

Problem 1. When the tool holder 9 of the turret 3 is advanced to the tool changing position to extract the tool 7 from the spindle unit 1, the corners of the concave cam surfaces 80' of the cam 8' act on the rollers 29' to move the finger 91 of the tool holder along a path L', namely, along paths $L_1 \rightarrow L_c \rightarrow L_2$ (FIG. 7C). When the direction of movement of the finger 91 changes from a horizontal direction for the finger 91 to engage the groove 71 to a vertical direction for the finger 91 to extract the tool 7, the finger 91 must move along a path $L_c$ having the shape of an arc of a circle having a radius r. Accordingly, a bending stress is induced in the arbor 70 and the finger 91 is forced to slip relative to the groove 71, and thus an excessively large force acts on the extremity of the tool holder 9, which is an obstacle to the smooth insertion and extraction of the tool to and from the spindle unit, and a hindrance to a problem-free tool changing operation.

Problem 2. When raising the spindlehead, the tool changing operation is started necessarily upon the arrival of the spindlehead at a position where the first cams 8' and the second cam 2 engage the rollers 29' and the roller 39, respectively. Accordingly, when the spindle unit requires a moving range of a considerably large height, the rollers 29' and 39 must be placed respectively at considerably high positions, and thus the vertical stroke of the spindle unit for tool changing operation must be increased accordingly. Consequently, the machine tool must be constructed in a comparatively large size entailing disadvantages in the performance, manufacture, transportation and space for installation of the machine.

Problem 3. The crank 6' itself has the spring for retracting the turret, and the distance between the rollers 30', on which the links 4' act, and the support shaft $O_1$ is small. Therefore, a large force is required to hold the crank, and thus vibrations attributable to the variation of strain are large, which is a hindrance to a precise, smooth operation of the machine.

An object of the present invention is to solve these problems.

DISCLOSURE OF THE INVENTION

An invention stated in claim 1 has been made particularly to solve the foregoing Problem 1. According to this invention, as shown in FIGS. 1 and 2 by way of example, a crank 6 rotatably holding a turret 3 provided with a turret gear 27 and pivotally supported on a support 5 by a support shaft $O_1$ for swing motion, and the front end of a crank operating lever 4 provided with an extension spring 17 for biasing the crank 6 to the standby position and a roller 29 in the rear end thereof and pivotally supported on the support 5 by a support shaft O for swing motion are interlocked by a rod 10 combined with a spring 18 serving as a load limiter, a first cam 8 which acts on the roller 29 is attached to a vertically movable spindlehead 22, and a lever stopper 24 for stopping the crank operating lever 4 at a set position and a crank stopper 23 for stopping the crank 6 at a set position when advancing the crank 6 to a tool changing position are provided on the support 5.

Thus, when the spindlehead is raised for tool change, the first cam 8 acts on the roller 29 turning the crank operating lever 4 in the direction of an arrow A against the resilience of the extension spring 17 to pull a crank 6 toward the spindle unit 1. Upon the arrival of the finger 91 of a tool holder 9 provided on the turret at a predetermined position, the crank stopper 23 stops the crank and the further pulling movement of the crank operating lever 4 is absorbed by the load limiter associated with the rod 10. Consequently, the finger of the tool holder moves along ideal paths $L_1 \rightarrow L_p \rightarrow L_2$ for a smooth tool changing operation.

The invention stated in claim 2 includes means for solving the foregoing Problem 2, in addition to the invention stated in claim 1. As shown in FIGS. 4A, 4B, 5A and 5B by way of example, this invention includes additional means for horizontally shifting the crank operating lever 4 between a position where the roller 29 of the crank operating lever 4 is unable to engage the first cam 8 and a position where the roller 29 is able to engage the first cam 8 by the controlled action of a first actuator 15, means for horizontally shifting the second cam 12 between a position where the second cam 12 is able to engage the roller 39 of the tool releasing lever 19 relating to releasing a tool from the spindle unit 1 and a position where the second cam 12 is unable to engage the roller 39 by the controlled action of a second actuator 16, and means for controlling the actuators 15 and 16 for connected actions.

When the spindlehead 22 is raised for a tool change, the first actuator 15 positions the crank operating lever 4 so that the roller 29 is able to engage the first cam 8, and the second actuator 16 positions the second cam 12 so that the second cam 12 is able to engage the roller 39 of the tool releasing lever 19. When the spindlehead 22 is raised for machining, the first actuator 15 positions the crank operating lever 4 so that the roller 29 is unable to engage the first cam 8, and the second actuator 16 positions the second cam 12 so that the second cam 12 is unable to engage the roller 39 of the tool releasing lever 19. Thus, the range of vertical movement of the spindle unit for machining is enlarged substantially without increasing the height of the machine tool.

The invention stated in claim 3 provides improvements in the rod unit and the first and second actuator means of the invention stated in claim 2. As shown in FIGS. 3, 4A, 4B, 5A and 5B by way of example, the rod 10 is connected at the opposite ends thereof to the extremity of the crank 6 and to the extremity of the crank operating lever 4 by ball joints each consisting of a socket 101 and a ball B, the first actuator 15 is connected coaxially to the crank operating lever 4, and the second actuator 16 is connected to the second cam 12.

Since both the crank operating lever 4 and the second cam 12 are supported on a fixed frame, the controlling actuators can be disposed rationally, and the adaptable movement of the rod 10 on the ball joints relative to the crank operating lever 4 and the crank 6 enables a smooth shift of the crank operating lever 4 in the direction of an arrow $F_1$ (FIG. 4B).

The invention stated in claim 4 includes means for solving the foregoing Problem 3 in addition to those of the inventions stated in claims 1 to 3. As shown in FIG. 1, the invention stated in claim 4 includes, in addition to those of the inventions stated in claims 1 to 3, an arrangement in which the rod 10 is connected to the lower end of the crank 6 so that the junction $J_2$ of the rod 10 and the crank operating lever 4 is on or slightly deviated in the biasing direction of the spring 17 from a straight line X—X passing the junction $J_1$ of the rod 10 and the crank 6, and the center of the support shaft O supporting the crank 6 when the turret is located at the standby position, and the crank 6 swings substantially along the straight line X—X.

Thus, the point of action of force (junction) on the crank 6 is sufficiently distant from the supporting shaft supporting the crank 6. Accordingly, the motion of the crank operating lever 4 can be surely transmitted to the crank 6, only a force sufficient to hold the crank unit is necessary in moving the crank, vibration attributable to the variation of strain in the support shaft supporting the crank is greatly reduced, and the crank can be securely held at the standby position by a small force.

As apparent from the foregoing description, according to the present invention, since the rod 10 for swinging the crank is joined through the spring 18 to the crank, and the crank is stopped at a set position by the crank stopper 23, the path of the finger 91 when attaching a tool to and removing the tool from the spindlehead coincides with an ideal path ($L_1 \rightarrow L_p \rightarrow L_2$), and thus the excessive force that acts on the finger 91 during a transient period in which the finger 91 of the known automatic tool changer moving horizontally to engage the groove 71 of the arbor starts moving in a vertical direction along the curved path $L_c$ (FIG. 7C) can be eliminated, so that progressive increase in the play of the arbor gripping parts of the spindlehead and in the play of the tool holders of the turret can be prevented.

Furthermore, changing the positional relationship between the crank operating lever 4 and the first cam 8 and that between the tool releasing lever 19 and the second cam 12 respectively by the actuators 15 and 16 between an interlocking relationship for tool changing operation and a separate relationship for machining operation, extends the moving range of the spindlehead for machining to the upper tool changing position.

Still further, biasing the crank operating lever, i.e., a driving member, by the spring and applying a force to the crank, i.e., a driven member, at the extremity thereof farthest from the support shaft supporting the crank, ensures the transmission of the motion of the crank operating lever to the crank. The arrangement of the rod and the crank operating lever substantially along a straight line extending in the direction of swing motion of the crank effectively prevents the vibration of the crank and the crank can be securely held at the standby position. Since the crank can be operated by a small force, the crank can be operated by a single mechanism without requiring a pair of symmetrical mechanisms necessary in the known automatic tool changer.

BRIEF DESCRIPTION OF THE DRAWINGS

FIGS. 7A to 7C are views showing a conventional tool changer, in which FIG. 7A is a partly cutaway side elevation of the tool changer, FIG. 7B is a partly cutaway plan view of the same tool changer, and FIG. 7C is a view showing the path along which the finger of a tool holder moves for tool changing operation.

BEST MODE OF CARRYING OUT THE INVENTION

Figure 1:
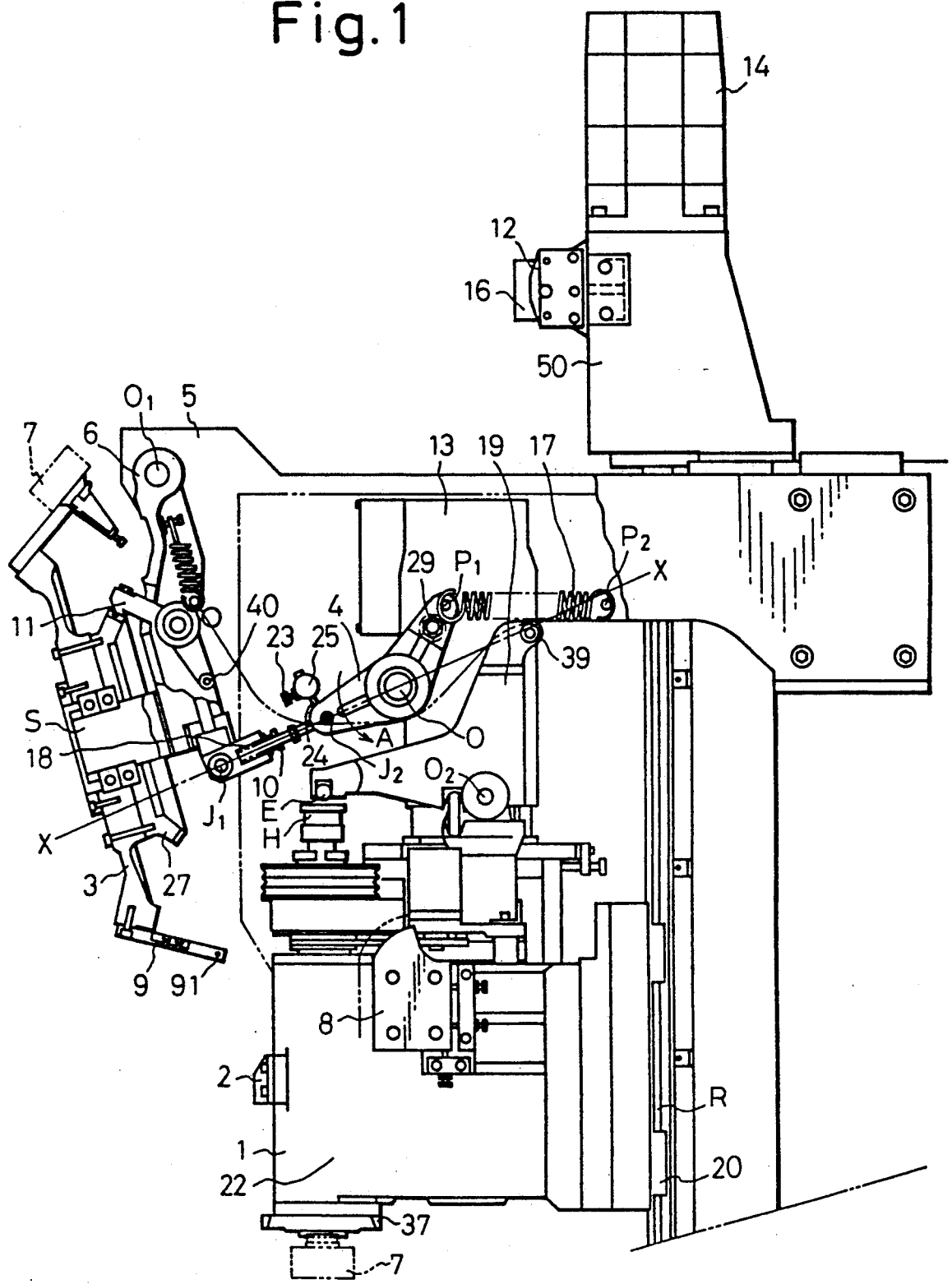
FIG. 1 is a partly cutaway side elevation of a tool changer embodying the present invention.
Figure 2:
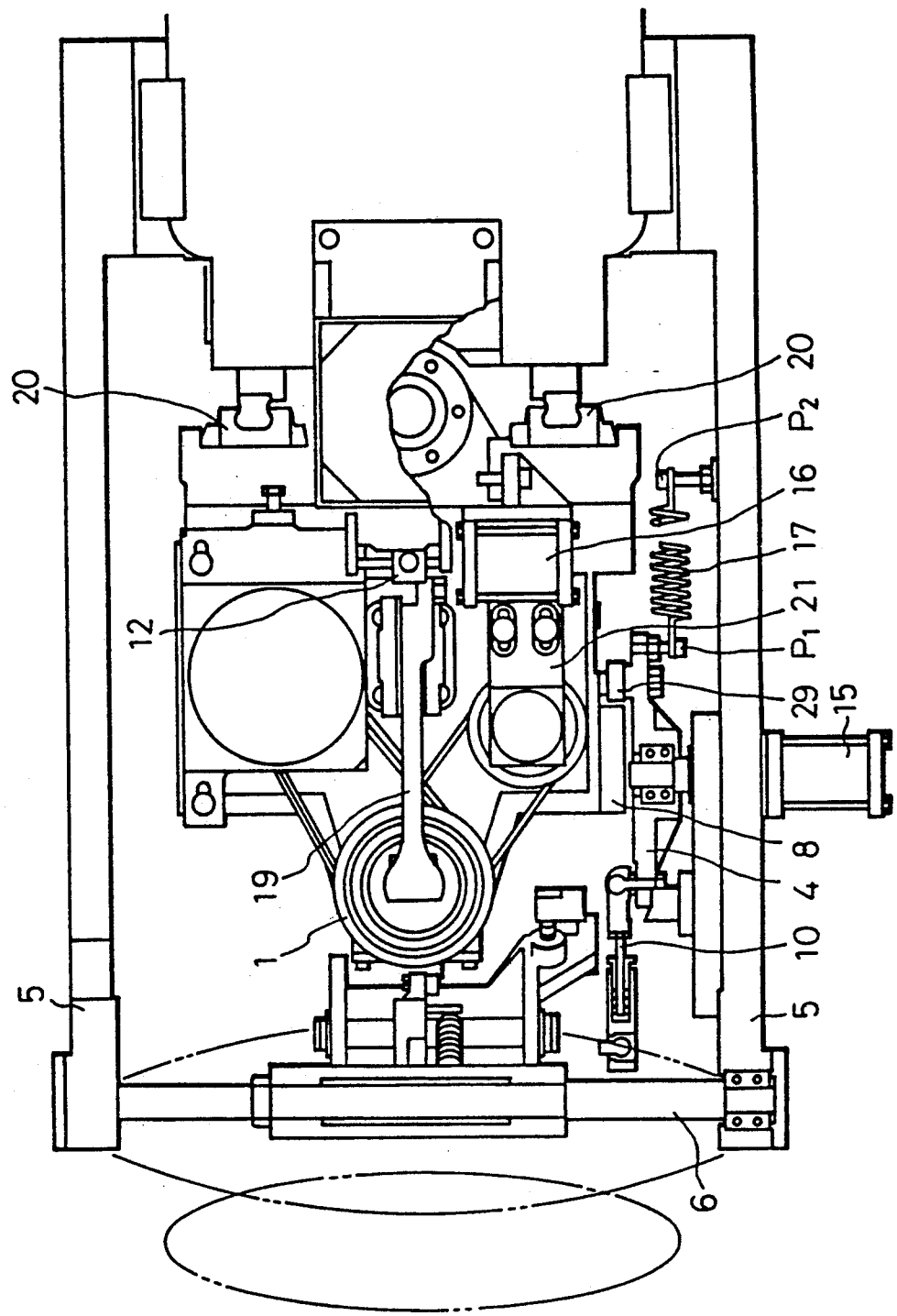
FIG. 2 is a partly cutaway plan view of the tool changer of FIG. 1.

Referring to FIGS. 1 and 2, a spindlehead 22, similar to that of a machine tool incorporating the conventional automatic tool changer (FIGS. 7A and 7B), is vertically movable along a linear rail R. Dispose in the middle portion of the front surface of the spindlehead 22 is a spindle unit 1 provided with a spindle gear 37 at the lower end thereof, a tool releasing mechanism H at the upper end thereof, and a third cam 2 at the middle of the front surface thereof. An L-shaped tool releasing lever 19 having a horizontal arm and a vertical arm is supported pivotally on a support shaft $O_2$ for a swing motion in the central portion of the upper end of the spindlehead 22. An operating member E, which engages the tool releasing mechanism H, is attached to the extremity of the horizontal arm of the tool releasing lever 19, and a roller 39 is supported on the extremity of the vertical arm of the tool releasing lever 19. Thus, the spindlehead 22 has the same construction as the conventional spindlehead, except that a first cam 8 provided on the spindlehead 22 is different from the first cams 8' (FIG. 7A) of the conventional automatic tool changer. The first cam 8 has a convex cam surface 80 and is attached to one side surface of the spindle unit 1.

Figure 6A:
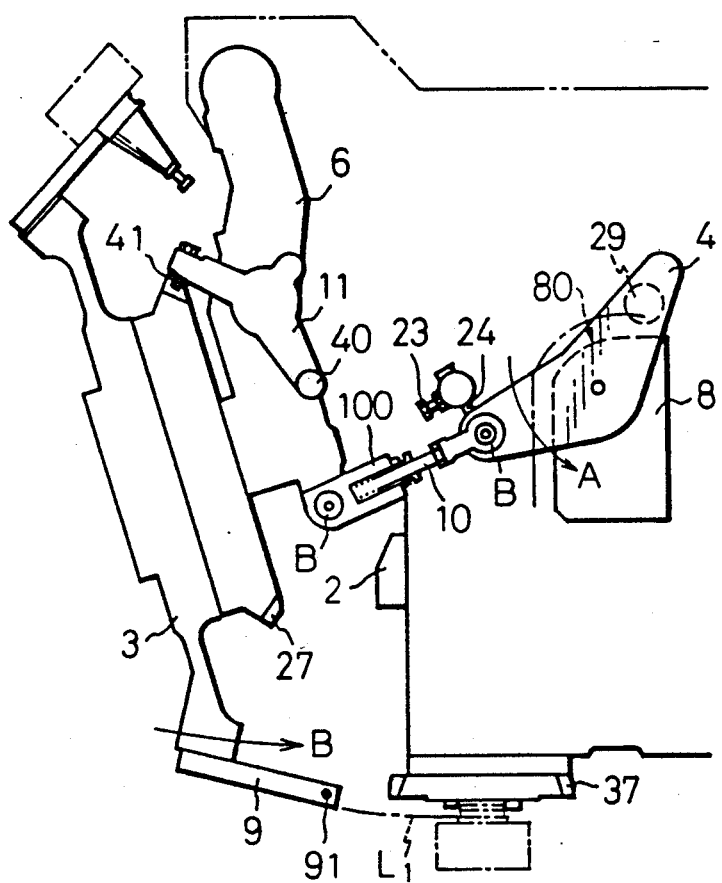
FIGS. 6A to 6D are side elevations of assistance in explaining the operation of the tool changer, in which the mechanisms of the tool changer are in a standby position in FIG. 6A, a tool is held by a tool holder in FIG. 6B, the mechanisms of the tool changer are in a turret indexing position in FIG. 6C, and the path of the finger of the tool holder is shown in an enlarged view in FIG. 6D.
Figure 6C:
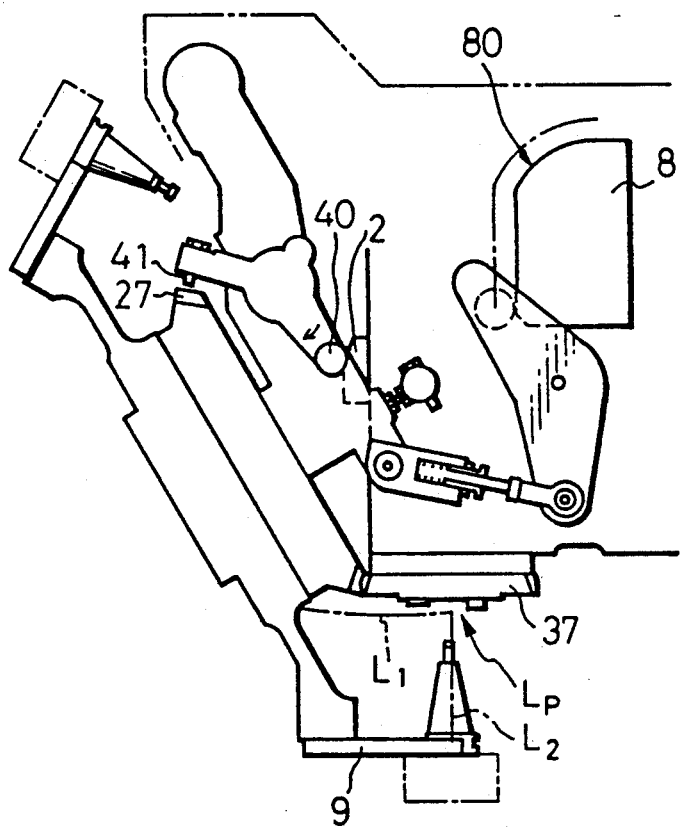
Figure 7C:
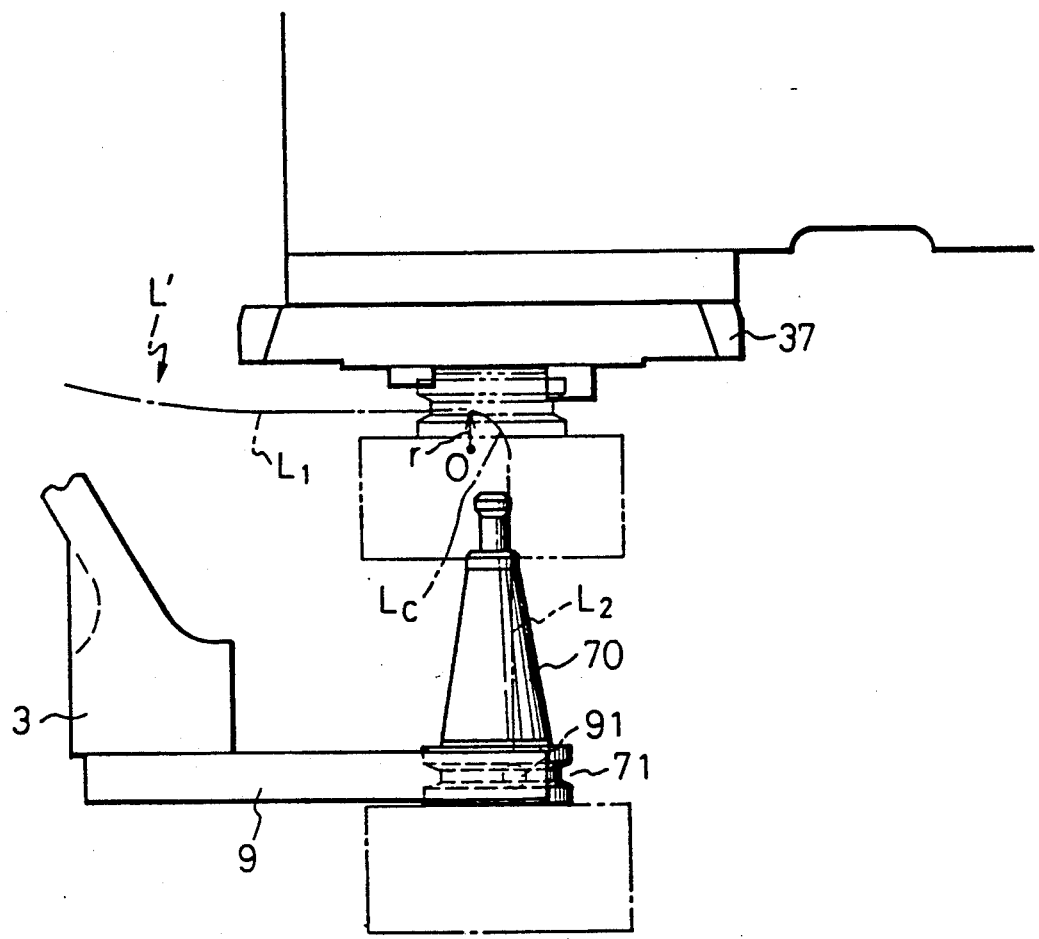

A turret 3 employed in the present invention has the same construction as that of the conventional automatic tool changer shown in FIG. 7A. That is, a turret 3 provided with a plurality of tool holders 9 each having a finger 91 and arranged along the circumference of the turret 3, and a turret gear 27 for indexing the turret 3 in selecting a tool is supported rotatably on a crank 6 by a shaft S. A locking lever 11 is supported pivotally on the crank 6 and is biased resiliently so that a locking projection 41 (FIG. 6C) provided at the upper end thereof is in engagement with the turret gear 27. A roller 40 is provided on the lower end of the lever 11. The crank 6 has a different construction to that of the conventional automatic tool changer; that is, the crank 6 is suspended merely from a support shaft $O_1$ supported on a support 5.

TURRET OPERATING MECHANISM

A two-arm crank operating lever 4 is supported pivotally for swing motion on the support 5 by a support shaft O. A roller 29 is supported on the extremity of the upper arm of the crank operating lever 4. A rod 10 is joined at the rear end thereof to an extremity of the front arm of the crank operating lever 4 by a joint $J_2$, and at the front end thereof to the lower end of the crank 6 by a joint $J_1$, and an extension spring 17 is extended between a pin $P_1$ attached to the extremity of the upper arm of the crank operating lever 4 and a pin $P_2$ attached to the support 5 to bias the turret 3 resiliently to the standby position. A lever stopper 24 is provided on a stud 25 attached to the support 5 to stop the crank operating lever 4 so that the center of the joint $J_2$ is positioned on or slightly above a straight line X—X passing through the center of the support shaft O and the center of the joint $J_1$. An adjustable crank stopper 23 is provided on the stud 25 to stop the crank 6 at a set position when the crank 6 is advanced for a tool change.

ROD CONNECTING MECHANISM

Figure 3:
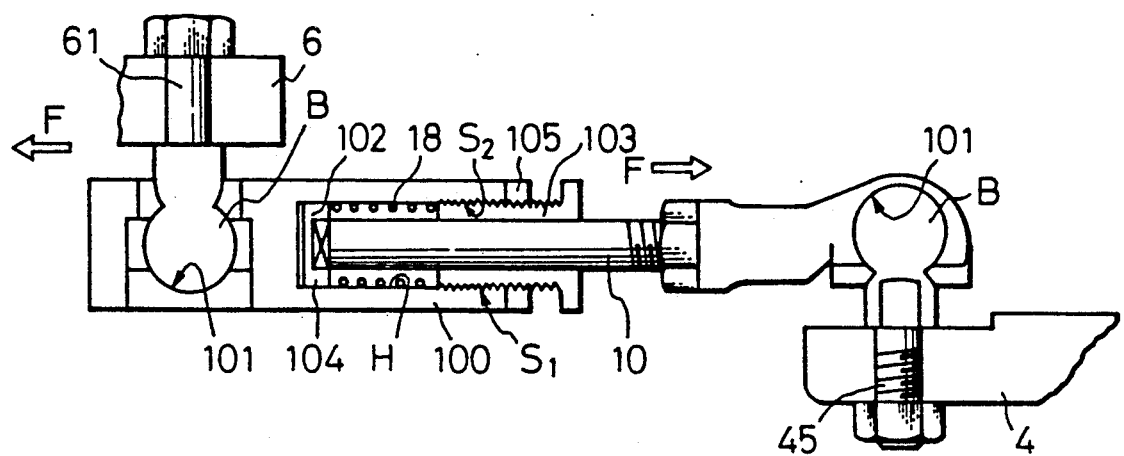
FIG. 3 is an enlarged view of a rod unit shown in FIG. 2.

The rod 10 is connected to the crank 6 by a rod connecting mechanism as shown in FIG. 3. A ball B formed at the extremity of a bolt 61 projecting from one side of the lower end of the crank 6 is seated on the spherical surface 101 of a bearing member provided in the outer end of a sleeve 100. A compression spring 18 is compressed within the cylindrical bore H of the sleeve 100 provided with an internal thread $S_2$ between a spring seat 104 fixed to one end of the rod 10 on the side of the crank 6 and a bush 103 provided with an external thread $S_1$ and screwed in the internally threaded bore H of the sleeve 100 so as to be loaded at 40 kg. The bush 103 is locked in place by a locking nut 105. A ball B formed at the extremity of a bolt 45 projecting from one side of the extremity of the front arm of the crank operating lever 4 is seated on the spherical surface 101 of a socket member joined to the other end of the rod 10.

OPERATING MODE SELECTING MECHANISM

Figure 4A:
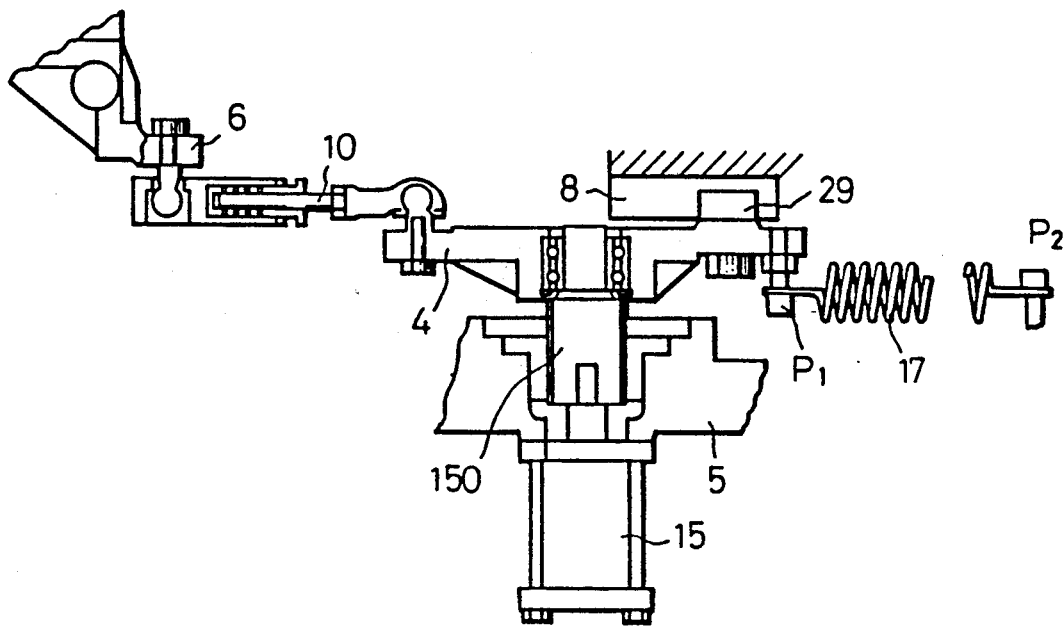
FIG. 4A is a plan view of a first actuator unit in a position for tool changing operation.
Figure 4B:
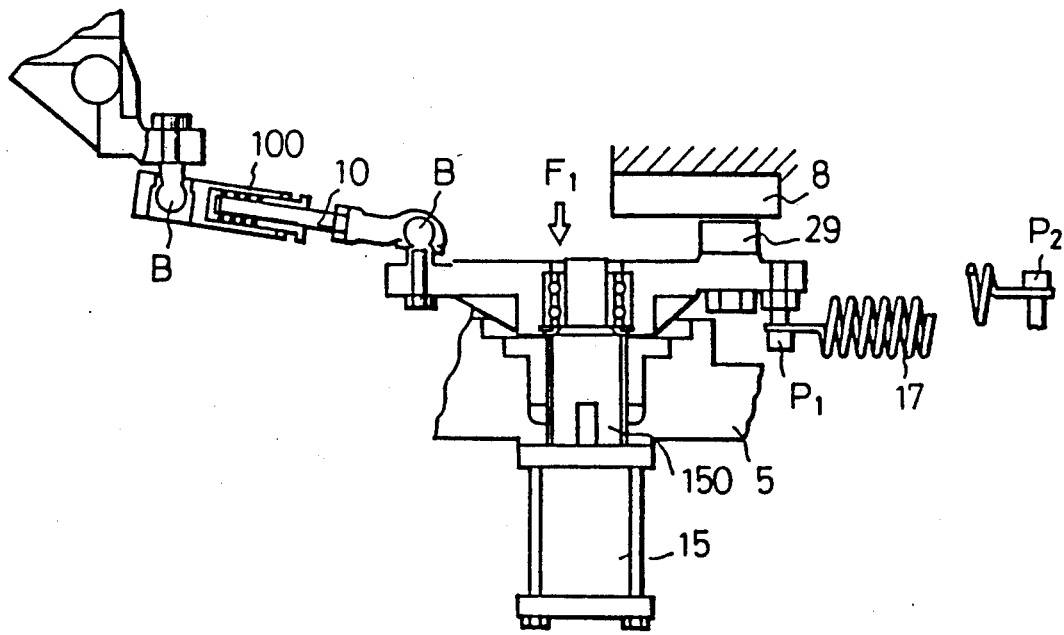
FIG. 4B is a plan view of the first actuator unit in a position for machining operation.

Referring to FIGS. 4A and 4B, the crank operating lever 4 is mounted for free swing motion on the plunger 150 (support shaft O) of a first actuator 15 fixed to the support 5.

Figure 5A:
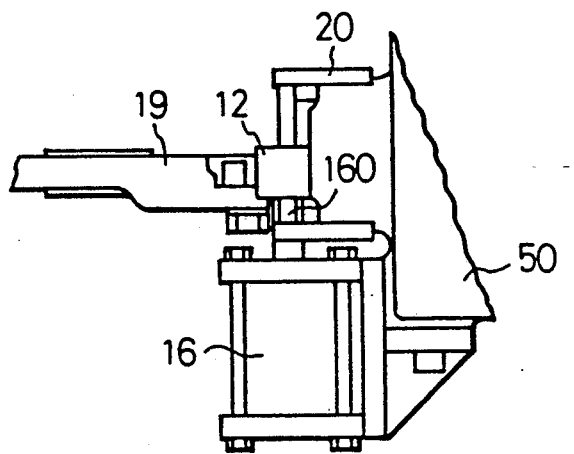
FIG. 5A is a plan view of a second actuator unit in a position for tool changing operation.
Figure 5B:
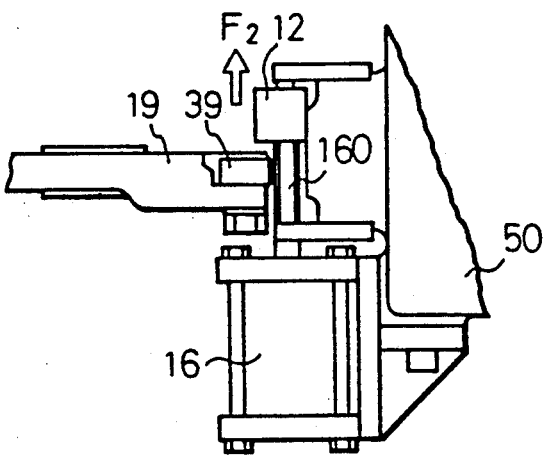
FIG. 5B is a plan view of the second actuator unit in a position for machining operation.

Referring to FIGS. 5A and 5B, a second cam 12, which has the same shape as the second cam of the foregoing known automatic tool changer, for acting on the roller 39 provided at the upper end of the upper arm of the tool releasing lever 19 is fixed to the plunger 160 of a second actuator 16 fixed to an upper second support 50. The actuators are usual pneumatic cylinder actuators.

TOOL CHANGING OPERATION

In FIG. 1, the turret 3 is held at the standby position, and a tool 7 is in a machining operation. In this state, only the crank operating lever 4 is biased clockwise by the extension spring 17, and the crank operating lever 4, which is in contact with the lever stopper 24 to hold the crank 6 suspending the turret 3, will swing in a direction along a straight line aligned with the axes of the rod 10 and the front arm of the crank operating lever 4.

When a tool change command is given, the spindlehead 22 is raised along the linear rail R. Upon the arrival of the spindlehead 22 at a position shown in FIG. 6A, the convex cam surface 80 of the first cam 8 engages the roller 29. As the spindlehead 22 is raised further, the crank operating lever 4 is caused to swing in the direction of an arrow A by the first cam 8, and thereby the crank 6 is pulled toward the spindlehead 22 to a position shown in FIG. 6B. In the state shown in FIG. 6B, the finger 91 of the tool holder 9 is received in a groove 71 formed in the arbor 70 of the tool 7 (FIG. 6D), and the crank stopper 23 is in abutment with the crank 6 to stop a further advance of the crank 6 beyond a set front position. A slight further pulling movement of the rod 10 in the direction of an arrow F caused by the action of the rounded corner of the cam surface 80 on the roller 29 is absorbed by the compression of the compression spring 18 by the rod 10.

Figure 6B:
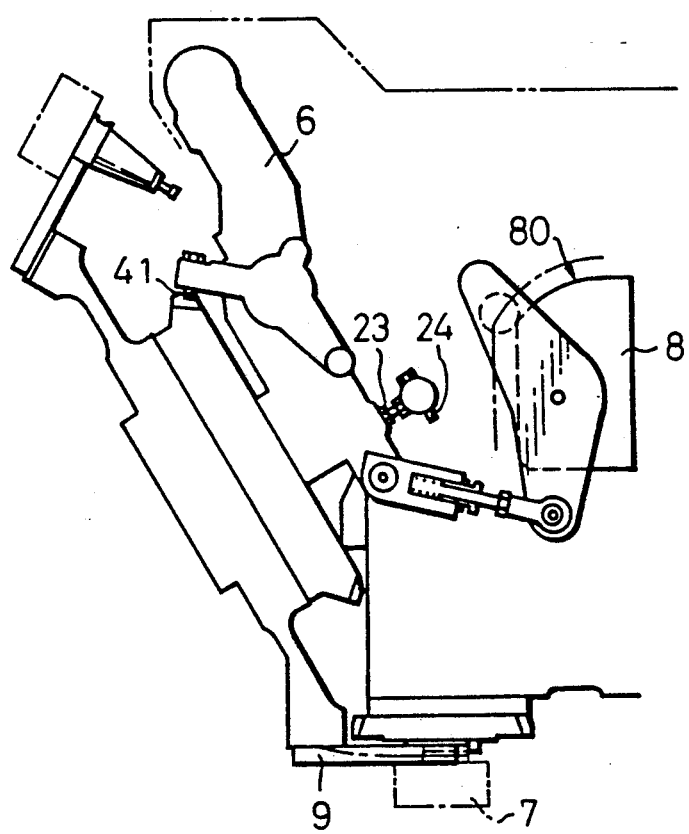

In the state shown in FIG. 6B, the roller 39, not shown in FIG. 6B, has been brought into engagement with the second cam 12, not shown in FIG. 6B. As the spindle head 22 is raised further, the second cam 12 turns the tool releasing lever 19, so that the operating member E acts on the tool releasing mechanism H provided on the upper end of the spindle unit 1 to remove the gripping force from the tool 7.

Figure 6D:
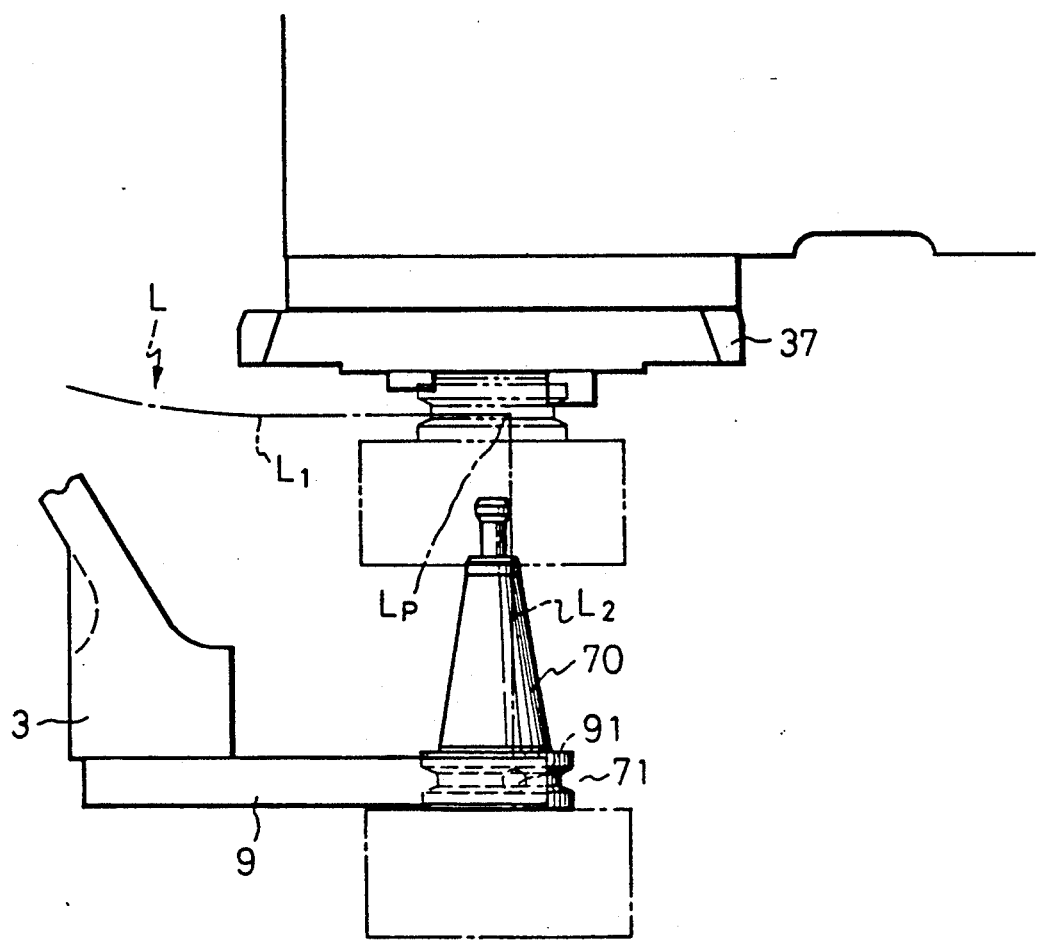

As the spindlehead 22 is raised further to a position shown in FIG. 6C, the arbor 70 of the tool 7 is extracted from the lower end of the spindle unit 1 by the finger 91 of the tool holder 9, because the crank 6 is stopped at the set front position by the crank stopper 23 and hence the finger 91 of the tool holder 9 is immovable. In extracting the arbor 70 holding the tool 7 from the spindle unit 1, the finger 91 moves along paths $L_1 \rightarrow L_p \rightarrow L_2$ as shown in FIG. 6D.

Upon the arrival of the spindlehead 22 at a position shown in FIG. 6C, the spindle gear 37 and the turret gear 27 are engaged and, at the same time, the locking projection 41 of the locking lever 11 is disengaged from the turret gear 27 by the action of the third cam 2 on the roller 40. The spindle gear 37 is rotated for indexing to locate the tool holder 9 holding a selected tool under the spindle unit 1, and then the spindlehead 22 is lowered. Consequently, the turret gear 27 is locked by the locking lever 11, and the roller 39 is separated from the second cam 12 to restore the tool gripping force of the spindle unit 1. When the spindlehead 22 is lowered to the position shown in FIG. 6B, the arbor 70 is fully received in and firmly gripped by the spindle unit 1, the first cam 8 allows the roller 29 to move from a position shown in FIG. 6B to a position shown in 6A, so that the crank 6 is retracted from the tool changing position by the extension spring 17 to separate the tool holder 9 from the tool attached to the spindle unit 1, and thus the tool changing operation is completed.

MACHINING MODE

When the spindlehead 22 is raised to the tool changing position merely for the upward extension of the machining range, the first actuator 15 and the second actuator 16 shift the first cam 8 and the second cam to inoperative positions respectively. That is, the plunger of the first actuator 15 is retracted to shift the crank operating lever 4 horizontally in the direction of an arrow $F_1$ from a position shown in FIG. 4A to a position shown in FIG. 4B so that the roller 29 is positioned outside the path of the first cam 8, and, at the same time, the plunger 160 of the second actuator 16 is retracted to shift the second cam attached to the plunger 160 horizontally in the direction of an arrow $F_2$ from a position shown in FIG. 5A to a position shown in FIG. 5B so that the second cam 12 is positioned outside the path of the roller 39. Since the rod 10 is joined to the crank operating lever 4 and the crank 6 by ball joints, the crank operating lever 4 can be smoothly shifted without inducing excessive stress in the rod 10.

While the plungers of the actuators are retracted, neither the first cam 8 and the roller 29 nor the second cam 12 and the roller 39 are engaged even if the spindlehead 22 is raised to the tool changing position. Accordingly, the turret is held at the standby position, the tool is not removed from the spindle unit 1, and the machine tool is able to operate for machining with the spindlehead in the operating range including the tool changing position.

MODIFICATIONS

The first actuator 15 may be used for shifting the first cam 8 provided on the spindlehead instead of the crank operating lever 4. In such a case, the rod 10 interlocking the crank 6 and the crank operating lever 4 is not subjected to complicated displacement, and thus the rod 10 may be joined at the opposite ends thereof to the crank 6 and the crank operating lever 4 simply with pins instead of the ball joints.

The second actuator 16 may be used for shifting the roller 39 instead of the second cam 12 for the same effect.

I claim:

1. An automatic tool changer for a machine tool, comprising: a crank (6) supported for swing motion on a support (5) and rotatably holding a turret (3) provided with a turret gear (27); a crank operating lever (4) supported for swing motion on the support (5) and provided with a roller (29), and a spring (17) for biasing the crank (6) to a standby position; a rod (10) combined with a spring (18) which functions as a load limiter, and interlocking the crank (6) and the crank operating lever (4); a first cam (8) provided on the vertically movable spindlehead (22) of the machine tool so as to be able to engage the roller (29); a lever stopper (24) provided on the support (5) to stop the crank operating lever (4) at a set position; and a crank stopper (23) provided on the support (5) to stop the crank (6) at a set position when the crank (6) is advanced toward the tool changing position.

2. An automatic tool changer according to claim 1, wherein the horizontal positional relationship between said crank operating lever (4) and the first cam (8) is changed by a first actuator (15) between a positional relationship in which the roller (29) of the crank operating lever (4) is able to engage the first cam (8) and a positional relationship in which the roller (29) of the crank operating lever (4) is unable to engage the first cam (8), the horizontal positional relationship between a roller (39) provided on a tool releasing lever (19) for operating a tool releasing mechanism provided on the spindle unit (1) of the machine tool, and a second cam (12) provided on a second support (50) is changed by a second actuator (16) between a positional relationship in which the second cam (12) is able to engage the roller (39) of the tool releasing lever (19) and a positional relationship in which the second cam (12) is unable to engage the roller (39) of the tool releasing lever (19).

3. An automatic tool changer according to claim 2, wherein the rod (10) is joined at the opposite ends thereof to the crank (6) and the crank operating lever (4) by ball joints (101, B), the first actuator (15) shifts the crank operating lever (4), and the second actuator (16) shifts the second cam (12).

4. An automatic tool changer according to any one of claims 1, 2, or 3, wherein the rod (10) is joined to the lower end of the crank (6), the joint ($J_2$) of the rod (10) and the crank operation lever (4) is substantially on a straight line (X—X) passing the joint ($J_1$) of the rod (10) and the extremity of the crank (6) and the center of a support shaft (O) supporting the crank operating lever (4) when the turret (3) is held at the tool changing position, and the straight line (X—X) extends substantially along the direction of swing motion of the crank (6).

* * * * *